United States Patent [19]
Kawasaki et al.

[11] Patent Number: 5,908,338
[45] Date of Patent: Jun. 1, 1999

[54] EXHAUST SYSTEM FOR OUTBOARD MOTOR

[75] Inventors: Naoki Kawasaki; Masayuki Nisimura; Atsushi Noda; Mitsuhiko Ohta, all of Shizuoka-Ken, Japan

[73] Assignee: Suzuki Motor Corporation, Shizuoka-Ken, Japan

[21] Appl. No.: 08/964,153

[22] Filed: Nov. 6, 1997

[30] Foreign Application Priority Data

Jan. 31, 1997 [JP] Japan ..................... 9-019461

[51] Int. Cl.$^6$ ...................................... B63H 21/32
[52] U.S. Cl. ..................... 440/89; 60/320; 123/195 P
[58] Field of Search ................. 440/88, 89; 123/195 P, 123/41.82 R; 60/310, 320, 321

[56] References Cited

U.S. PATENT DOCUMENTS 5,370,564  12/1994  Fujimoto et al. .................... 440/89
5,463,990  11/1995  Rush et al. ........................ 440/89

FOREIGN PATENT DOCUMENTS 07055327  3/1995  Japan .
07317617  12/1995  Japan .
08218984  8/1996  Japan .

*Primary Examiner*—Jesus D. Sotelo
*Attorney, Agent, or Firm*—Finnegan, Henderson, Farabow, Garrett & Dunner, L.L.P.

[57] ABSTRACT

This invention is an outboard motor exhaust device compatible with a small, lightweight cylinder block, which simplifies the exhaust manifold assembly and allows greater precision of assembly. The engine of an outboard motor is located above an engine holder, and comprises a horizontally assembled cylinder head, cylinder block, and crank case. An air intake device is located on one side of the cylinder block, and the exhaust manifold comprising the exhaust device is located on the opposite side of the cylinder block from the air intake device. A side surface of the cylinder head and a side surface of the engine holder are coplanar and form a support for the exhaust manifold.

4 Claims, 9 Drawing Sheets

EXHAUST SYSTEM FOR OUTBOARD MOTOR

BACKGROUND OF THE INVENTION

The present invention relates to an exhaust device for an outboard motor, and, more particularly, to an exhaust device for an outboard motor with an engine having horizontally reciprocating pistons.

DESCRIPTION OF THE RELATED ART

Examples of outboard motor exhaust devices include Japanese Laid Open Patent Application Hei 6 (1994)-16187, describing the invention shown in FIG. 8, wherein an exhaust passage (3) linked to exhaust port (2) of the cylinder head is formed as a single unit within the cylinder block, and Japanese Laid Open Utility Model Application Hei 4 (1992)-134626, describing the invention shown in FIG. 9, wherein a separate exhaust manifold (5) is located between the cylinder head (6) and the exhaust passage (7).

However, when an exhaust passage is formed integrally with the cylinder block, the size of the cylinder block increases. This not only causes an increase in weight of the engine, but the configuration of the engine becomes more complex, and production costs increase. Because the exhaust passage is located near the cylinders, concerns arise about the cylinders becoming unacceptably warped because of the heat from the exhaust. Typically the cylinders and the exhaust passage share a common cooling water jacket. With that configuration, it is impossible to control the temperature of the exhaust passage independently from the temperature of the cylinders.

The problems mentioned above may be avoided to some extent by using a separate exhaust manifold. However, the top and bottom ends of the exhaust manifold for this type of motor are not in the same plane, which makes it very difficult to precisely assemble the motor. Consequently, the cost and complexity of machining the engine parts increases, and there is a greater chance of exhaust gas leaking from improperly matched joints, making this approach undesirable.

Thus, there is a need for an exhaust system which overcomes the problems and limitations of the conventional art.

SUMMARY OF THE INVENTION

Accordingly, an object of the present invention is to provide an exhaust system that addresses the problems, limitations, and disadvantages of presently used systems.

The present invention was made by taking into consideration the problems discussed above, with the objective of providing an outboard motor exhaust device requiring a small and lightweight cylinder block as part of a simplified exhaust manifold assembly, which can be assembled easily and with precision.

Another objective of this invention is to provide an outboard motor exhaust device in which transmission of exhaust heat to the cylinder is prevented, and where it is possible to control the temperature of the exhaust manifold separately from the temperature of the cylinders.

A further objective of this invention is to provide an outboard motor exhaust device which increases the cylinder block cooling efficiency, and has a simplified exhaust manifold cooling water discharge structure.

Yet a further objective of this invention is to provide an outboard motor exhaust device having a simplified water detection piping.

To achieve these objects and other advantages and in accordance with the purpose of the invention as embodied and broadly described, the outboard motor exhaust device of the present invention includes an outboard motor engine with vertically stacked cylinders and having cylinder head, cylinder block, and crank case components assembled in a horizontal plane. The outboard motor also has an engine holder below the engine, an air intake device located on one side of the cylinder block, and an exhaust manifold arranged on the opposite side of the cylinder block from the air intake device. A side of the cylinder head and a side of the engine holder are on the same plane, and support the exhaust manifold.

Water jackets formed in the cylinder block and cylinder head are of a different type from the water jacket formed in the exhaust manifold. The water jacket of the exhaust manifold is independent of the other water jackets. A pressure valve is provided in the cooling water outlet formed in the water jacket of the exhaust manifold, and is covered by a valve cover integrated with a union member through which a wastewater hose can be attached to the valve. A water opening for water testing purposes communicating with the inside of the water jacket of the exhaust manifold is provided at the bottom end of the exhaust manifold.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification, illustrate several embodiments of the invention, and together with the description serve to explain the principles of the invention. In the drawings.

DESCRIPTION OF THE PREFERRED EMBODIMENTS

Reference will now be made in detail to the present preferred embodiments of the invention, examples of which are described in the accompanying specification and/or illustrated in the accompanying drawings.

While the present invention can be broadly applied in the field of outboard motors, it is especially well suited for use in a water cooled outboard motor having horizontally reciprocating pistons.

Figure 1:
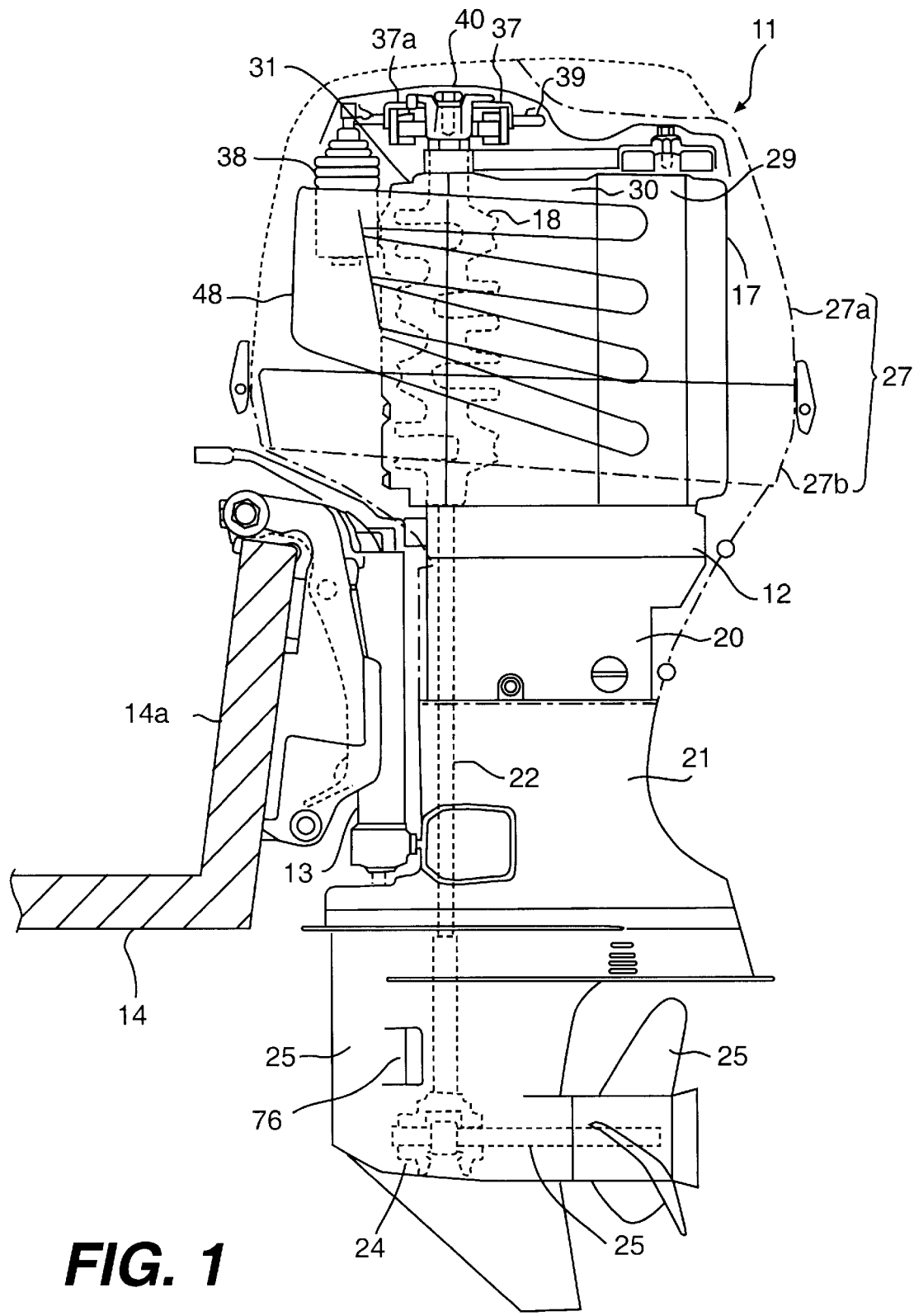
FIG. 1 is a left side view of an outboard motor showing one embodiment of the outboard motor exhaust device of the present invention.

FIG. 1 is a left side elevation drawing of an outboard motor incorporating the present invention. This outboard motor (11) is outfitted with an engine holder (12), and is mounted on a transom (14a) of a boat (14) via a bracket (13) attached to the engine holder (12).

Within the engine holder (12) are formed an exhaust passage (15) and a wastewater passage (16). An engine (17) is located above the engine holder. Also, a crank shaft (18) is located substantially vertically within the engine (17), such that it is at a right angle to the hull of the boat. Located below the engine holder (12) is a drive shaft housing (21) that shields an oil pan (20), and that contains an exhaust passage (19).

Oil pan (20) and drive shaft housing (21) have a passage for a downward extending drive shaft (22), which is connected to the lower end of the crank shaft (18). The propeller (26) is driven by a bevel gear (24) that couples the drive shaft (22) to a propeller shaft (25) placed in the gear case (23), which, in turn, is located below the drive shaft housing (21).

The engine (17) is covered over by an engine cover (27). The engine cover (27) can be divided along a horizontal line between an upper cover (27a) and a lower cover (27b). Lower cover (27b) can be further divided into left and right parts. The lower part of the engine holder (12), the oil pan (20), and the lower part of the engine (17) are covered by the lower cover (27b), while the upper part of the engine (17) is covered by upper cover (27a). In this structure, seal members (28) are formed in the area surrounding the interface of the engine holder (12) and the oil pan (20), as well as at the interface of the engine holder (12) and the lower part of the engine (17). These seal members (28), shown in FIG. 2, are attached to the inner surface of the lower cover (27b) so that ambient water does not penetrate the joints.

Figure 2:
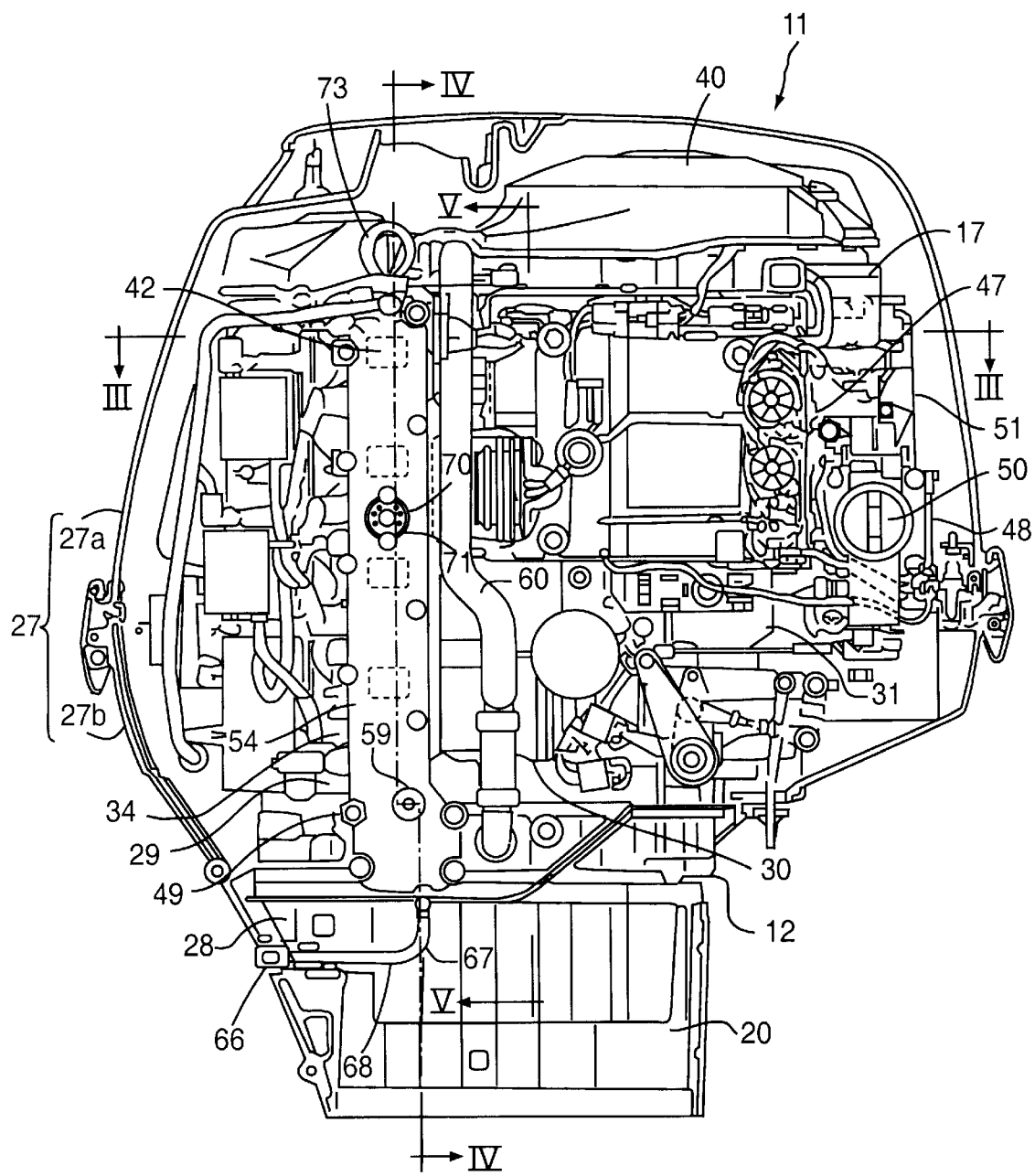
FIG. 2 is a right side view showing an enlargement of part the engine shown in FIG. 1.
Figure 3:
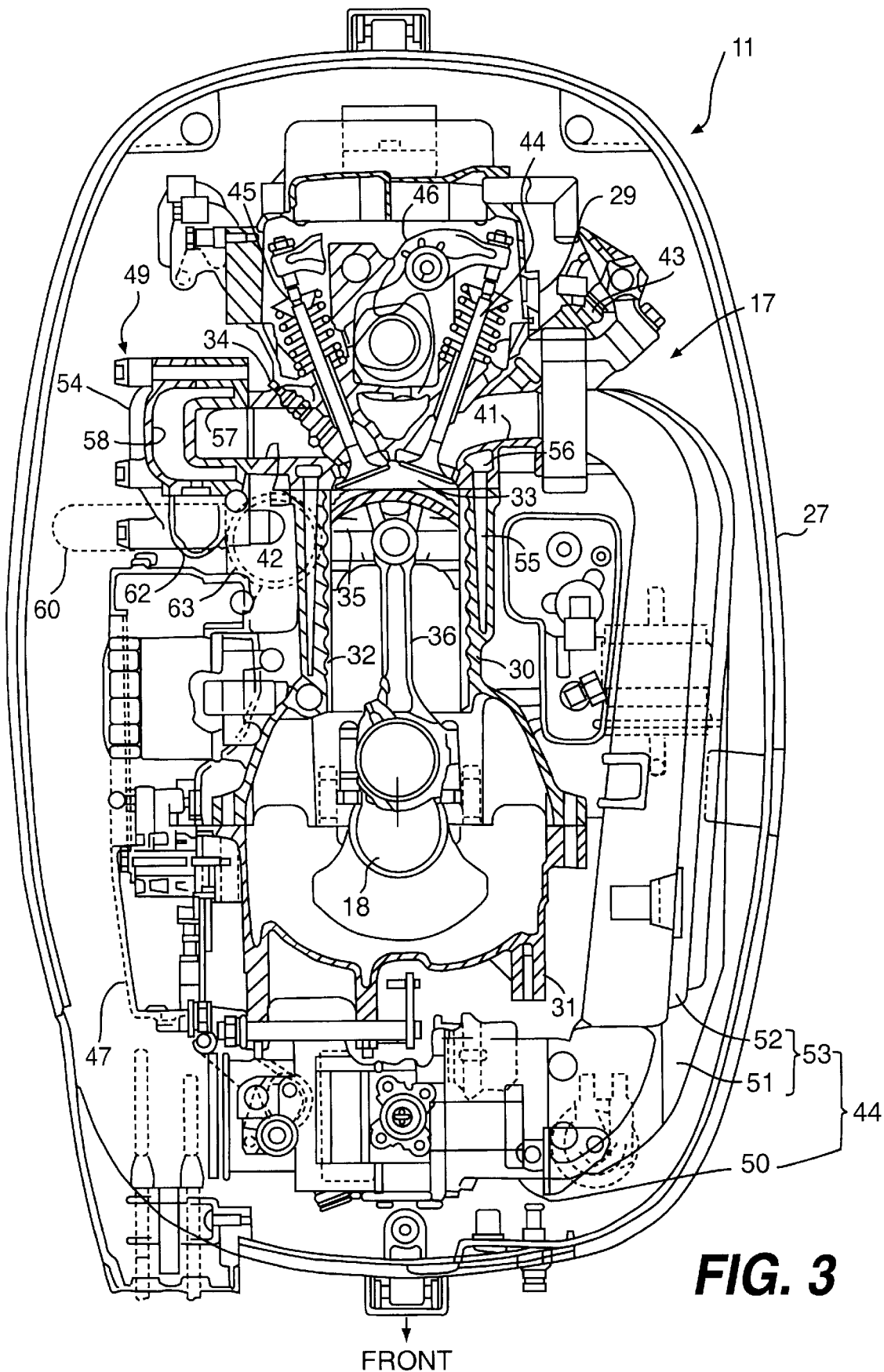
FIG. 3 is a cross section cut on line III—III in FIG. 2.

As shown in FIGS. 1–3, engine (17) is, for example, a water-cooled four-cylinder engine, having the cylinder head (29), the cylinder block (30), and the crank case (31), all vertically oriented and arranged horizontally relative to each other.

In FIG. 3, one of four cylinders (32) is shown in the cylinder block. Also, a combustion chamber (33) integral with cylinder (32) is formed in the cylinder head (29), and a spark plug (34) is inserted from the exterior of the cylinder head. Inserted in the cylinder (32) is a piston (35) that can slide freely in the horizontal direction. The piston (35) and the crank shaft (18) are connected by a connecting rod (36), so that the power generated during the power stroke of the piston (35) is converted to rotating motion of the crank shaft (18).

At the top end of the crank shaft (18) there is a flywheel/magnet device (37) used to generate electricity. Arranged on the exterior of this flywheel (37a) is a ring gear (39) that is operationally connected to the neighboring starter motor (38). Also, ring gear (39) is covered by a ring gear cover (40).

Figure 4:
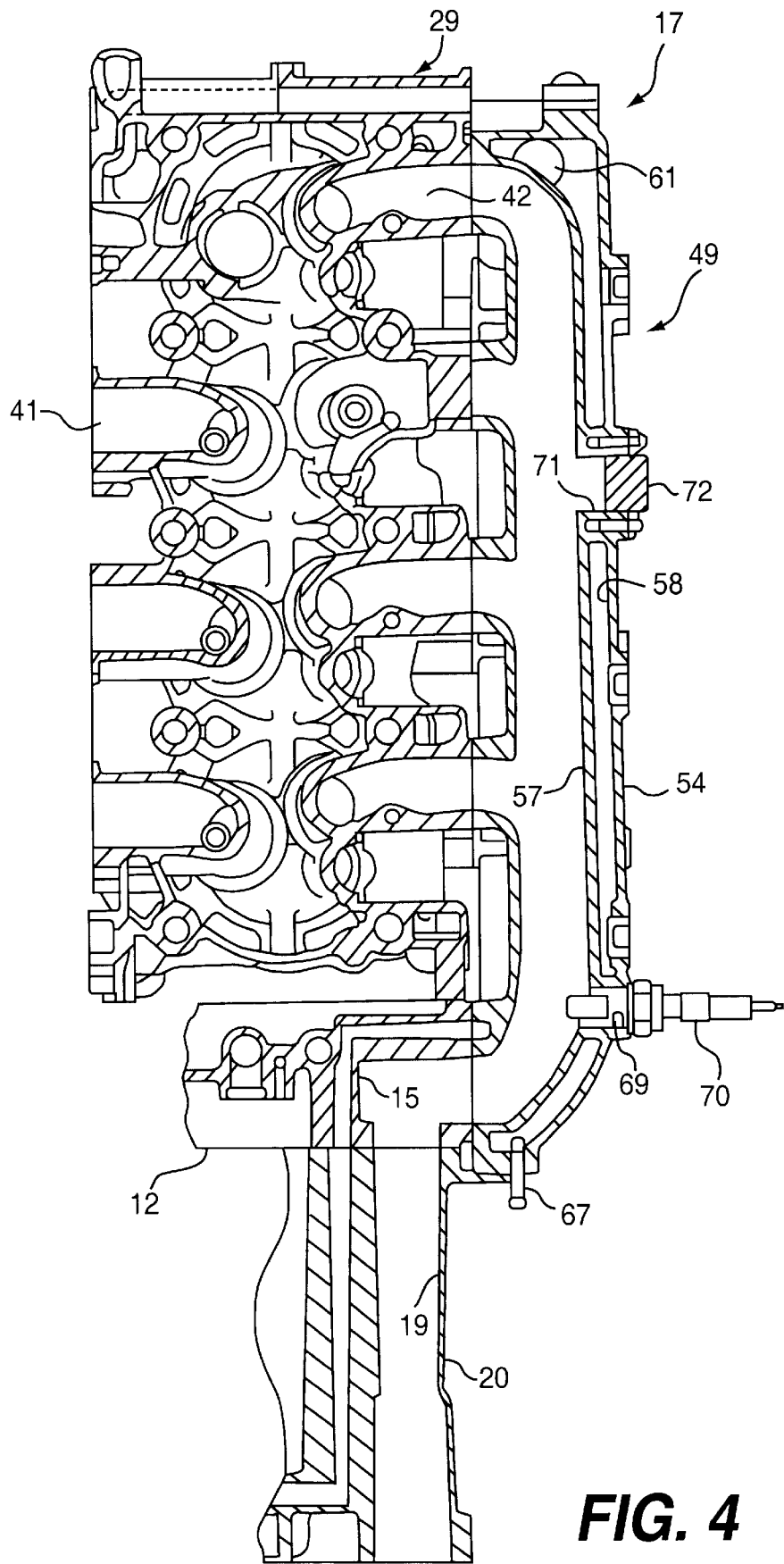
FIG. 4 is a cross section cut on line IV—IV in FIG. 2.

Within the cylinder head (29) are formed an exhaust port (42) and an air intake port (41) linked to the combustion chamber (33), as shown in FIGS. 3 and 4. An injector (43) that injects fuel inside the air intake port (41) is attached to the cylinder head (29). Moreover, arranged within the cylinder head (29) is an air intake valve (44) that opens and closes intake port (41), and an exhaust valve (45), which opens and closes exhaust port (42).

Electrical equipment (47), an air intake device (48), and an exhaust device (49) are arranged around the engine. The air intake device (48) comprises a throttle body (50), a surge tank (51), as well as an air intake manifold (53) outfitted with multiple air intake pipes (52) that extend into the respective cylinders from surge tank (51). The intake device arrangement is located on one side of the cylinder block (30).

The exhaust device (49) is located on the side of the cylinder block opposite the air intake device (48). The electrical equipment (47) is located on the same side as the exhaust device (49). The exhaust device has an exhaust manifold (54) supported by a side of the cylinder head (29) and by a side of the engine holder (12), which are coplanar.

Figure 5:
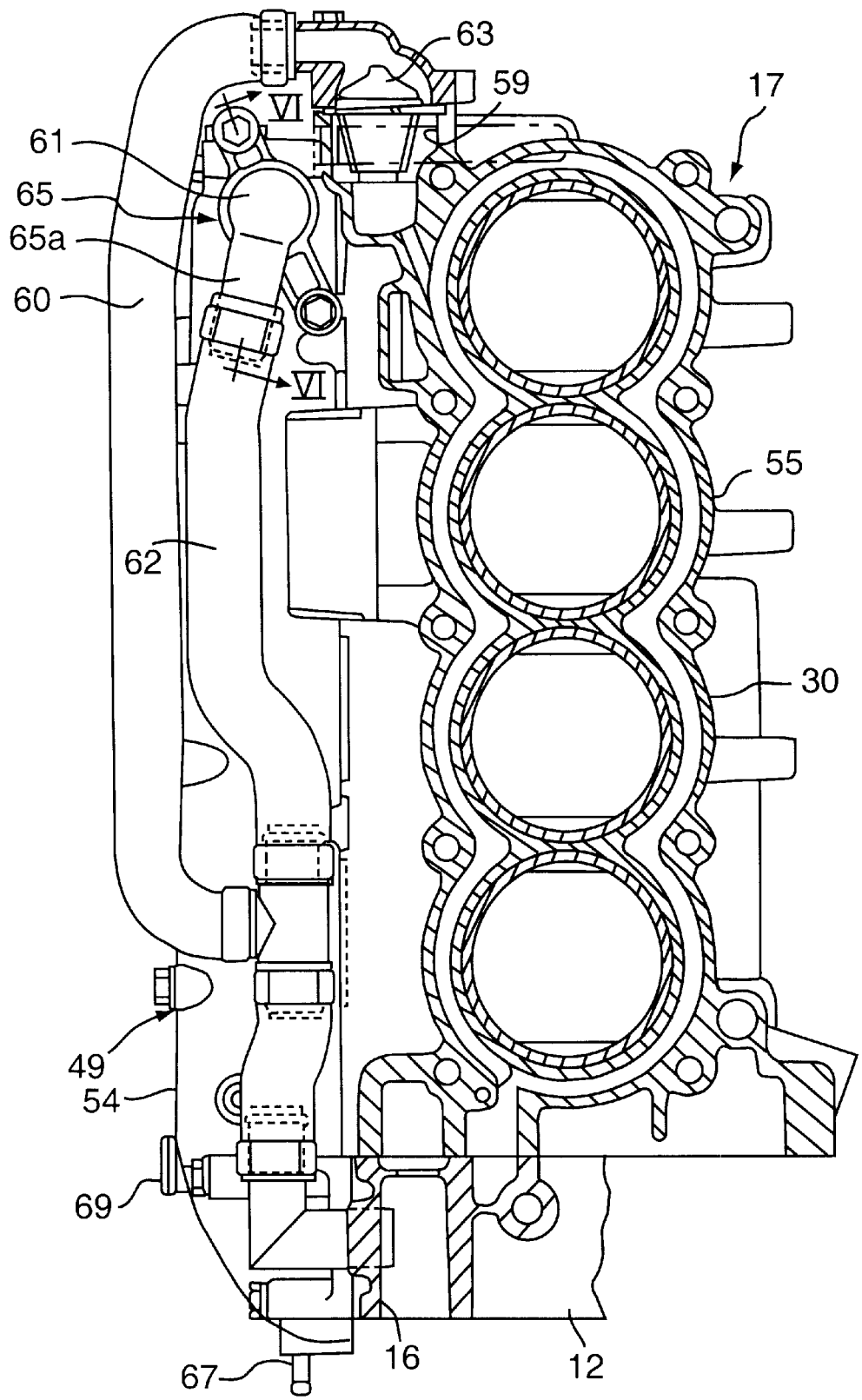
FIG. 5 is a cross section cut on line V—V in FIG. 2.

As shown in FIGS. 3–5, water jackets (55, 56) are formed around the cylinder inside the cylinder block (30), and around the combustion chamber (33) of cylinder head (29). Also, formed inside the exhaust manifold (54) are the exhaust port (42) and an exhaust passage (57), which are connected to the exhaust passages (15, 19) formed respectively in the engine holder (12) and in the oil pan (20). A water jacket (58) is formed around this exhaust passage (57).

The cooling water outlet (59) of the cylinder block water jacket (55) is located in the upper part of the cylinder block (30), and a wastewater hose (60) connected to cooling water outlet (59) extends downward from the outlet. The cooling water outlet (61) of the exhaust manifold water jacket (58) is also located in the upper part of the exhaust manifold (54), and a wastewater hose (62) connected to cooling water outlet (61) also extends downward from outlet (61). Wastewater hoses (60, 62) converge and are joined into one hose, which is connected to the wastewater passage (16) formed in the engine holder.

Figure 6:
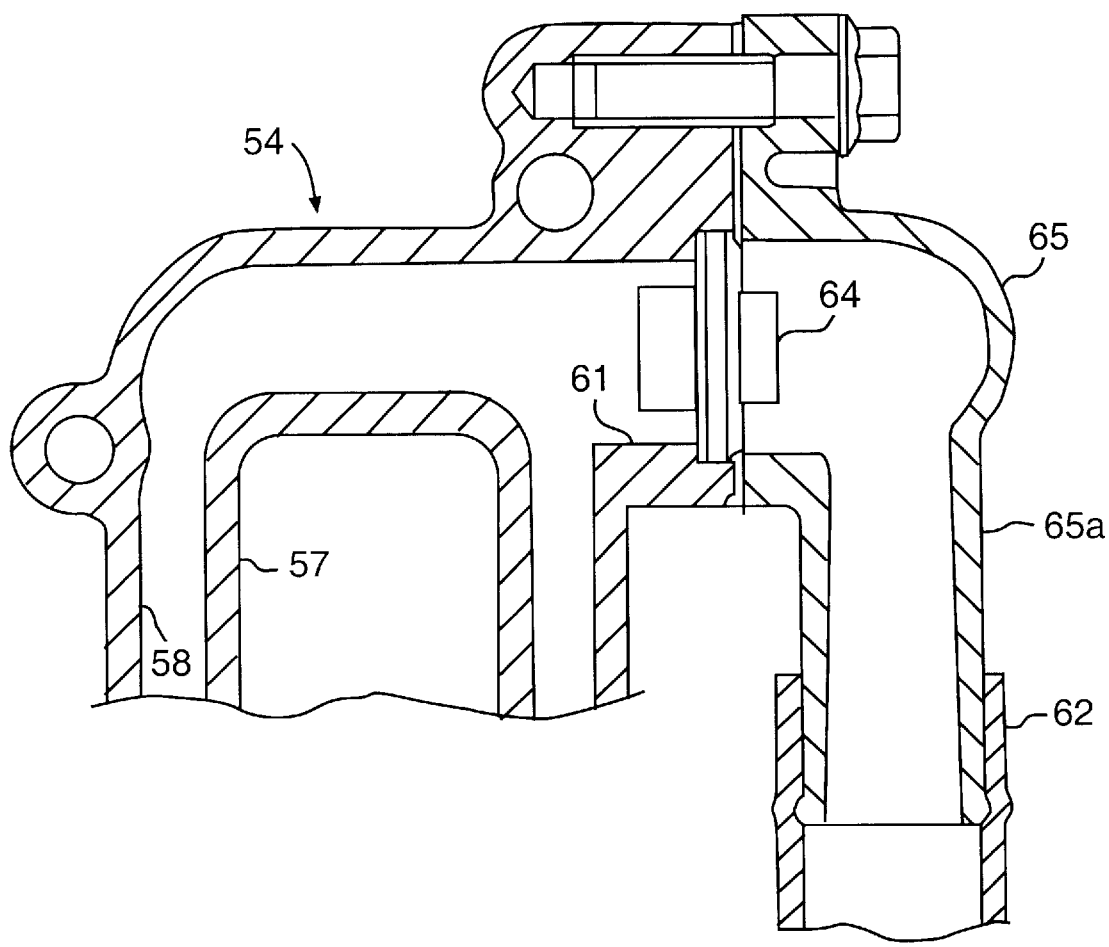
FIG. 6 is a cross section cut on line VI—VI in FIG. 5.

A thermostat (63) is provided in the cooling water outlet (59) of the cylinder block water jacket (55). As shown in FIG. 6, a pressure valve (64) is provided in the cooling water outlet (61) of the exhaust manifold water jacket (58). A valve cover (65) is attached to this cooling water outlet (61), and the wastewater hose (62) is connected to a union member (65a) that is integral with the valve cover (65).

As shown in FIG. 2, a water detection opening (66) used to check the cooling water is provided in the lower cover (27b), at the rear of the outboard motor (11). As shown in FIGS. 4–5, a water jacket opening (67) for water detection communicates with the interior of the lower end of wastewater manifold (54). A tube connects the water detection opening (66) and the jacket water opening (67).

On the lower part of the exhaust manifold (54), above seal member (28), there is an attachment base (69) used to attach an oxygen sensor (70). Furthermore, a hole (71) to sample exhaust gas is formed in exhaust manifold (54). The hole (71) is covered by a freely removable plug (72). A hook (73) used to hoist the engine is provided in the top part of the exhaust manifold (54). Also, wires connected to the electric instrumentation (47) are routed near the exhaust manifold water jacket (58).

Figure 7:
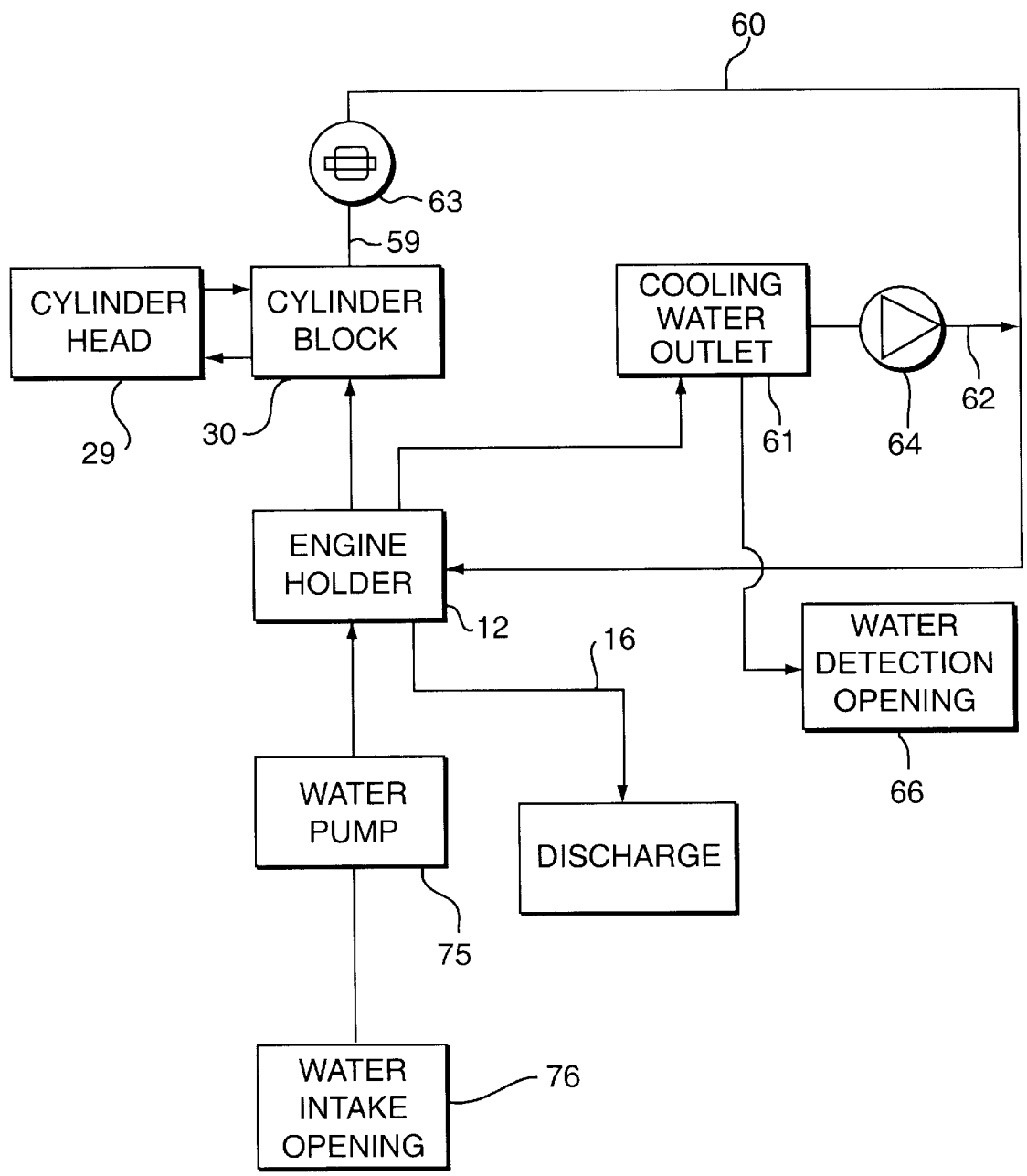
FIG. 7 is a block diagram of the cooling system.
Figure 8:
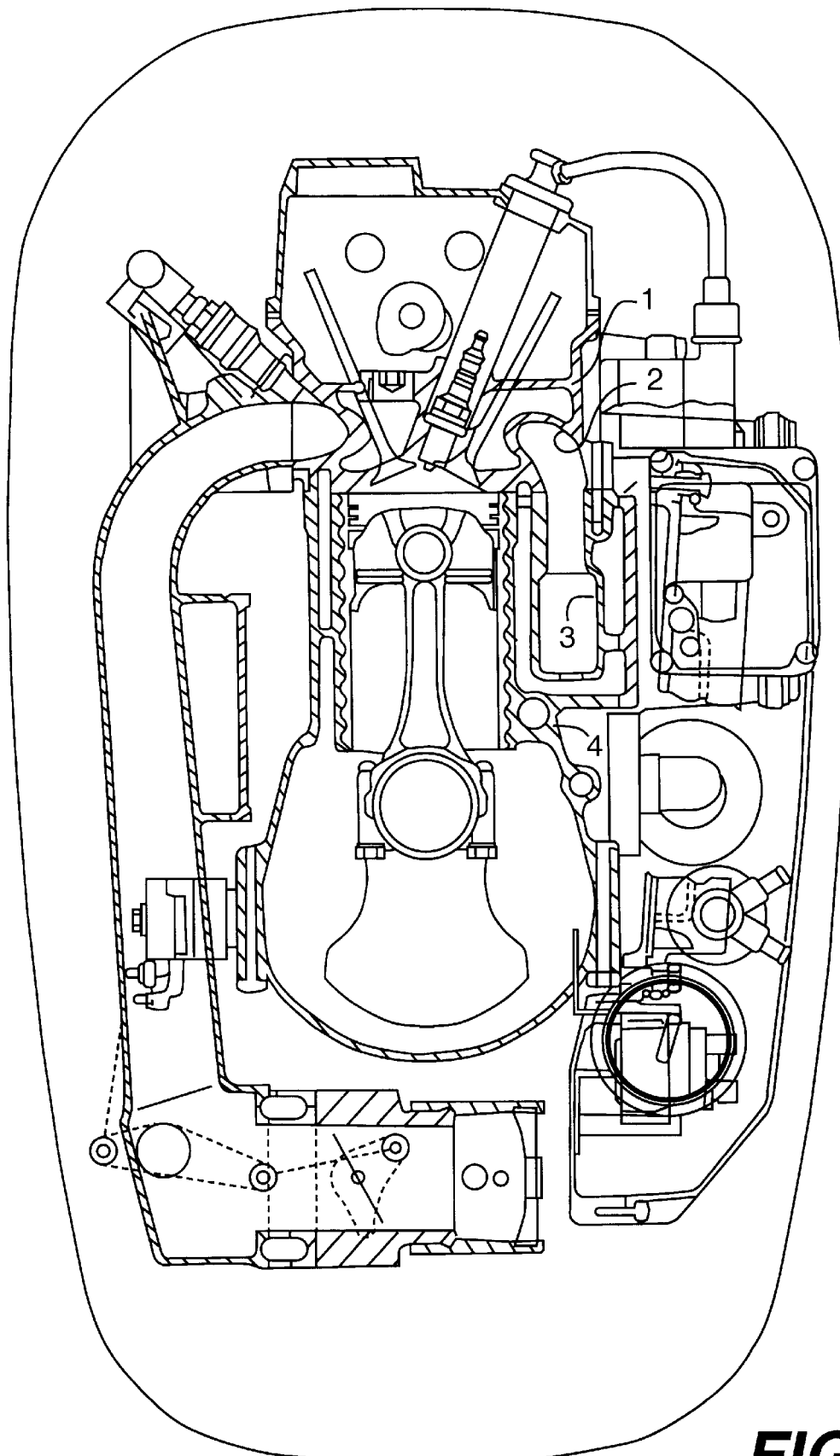
FIG. 8 is a diagram of an example of an exhaust device provided in a conventional outboard motor.
Figure 9:
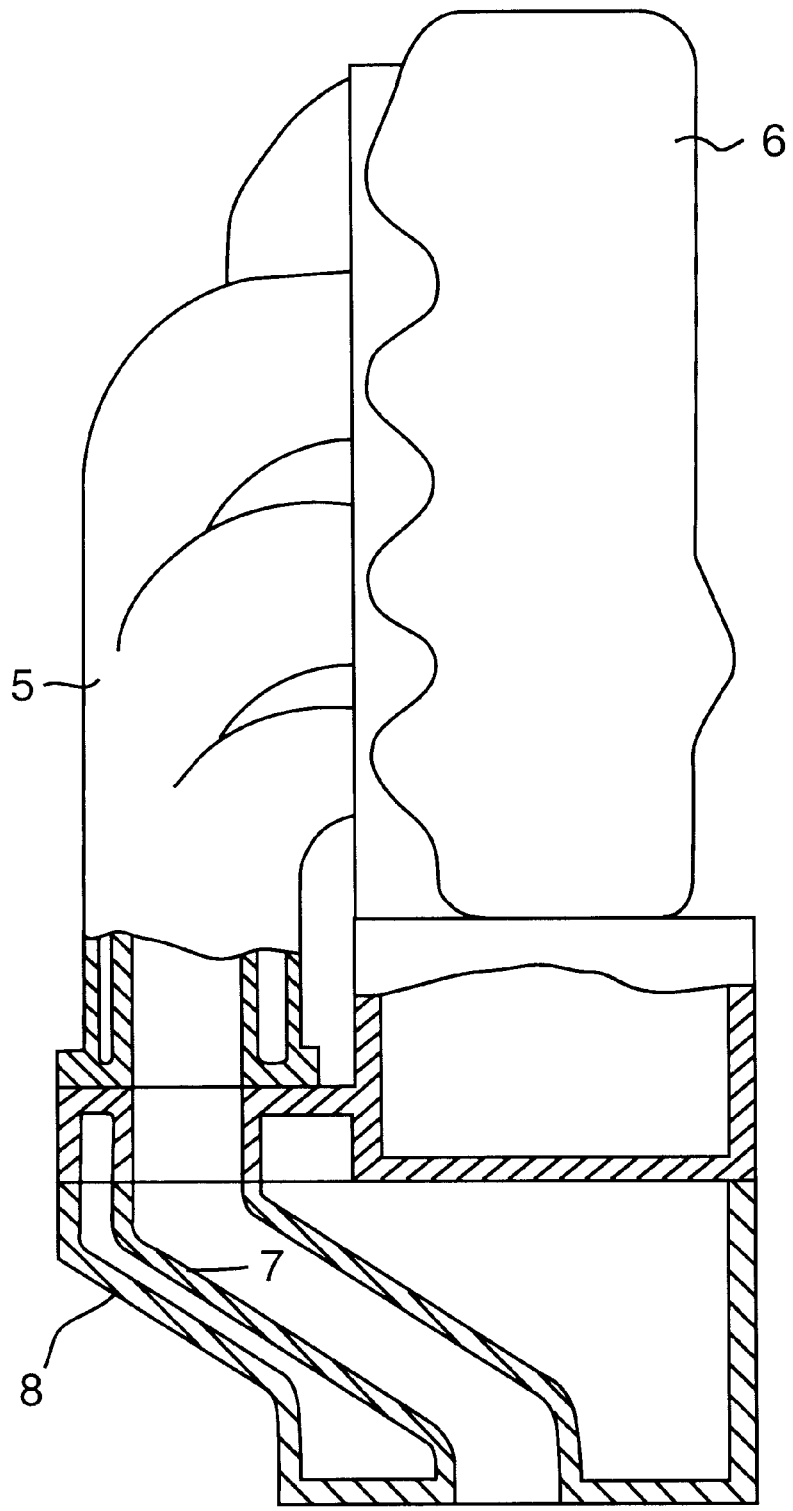
FIG. 9 is a block diagram showing another example of an exhaust device provided in a conventional outboard motor.

The cooling system block diagram shown in FIG. 7 depicts the flow of cooling water in the motor. Cooling water (for example seawater or lake water) that is taken up via the water intake opening (76) by the water pump (75) is led to the engine holder and divided along two paths. One path leads to the cylinder block water jacket (55), and the other to the exhaust manifold water jacket (58). Cooling water flowing to the cylinder block water jacket (55) continues to the cylinder head water jacket (56), and is then expelled to the exterior of the engine through the cooling water outlet (59) and through wastewater hose (60).

Cooling water flowing to the second path reaches the exhaust manifold water jacket (58) and then is expelled to the exterior through cooling water outlet (61) and through a wastewater hose (62). This water then converges with the cooling water from the wastewater hose (60), and goes through an opening in engine holder (12), before being discharged outside the outboard motor (11) from the wastewater passage (16).

The thermostat located in the cooling water outlet (59) closes to seal the water outlet until the cooling water reaches a given temperature, to prevent over cooling of the cylinder block (30) and of the cylinder head (29). Cooling water pressure that rises because the thermostat (63) is closed can be relieved by releasing cooling water through an outlet controlled by a pressure valve (64) provided in the cooling water outlet (61).

The air intake device (48) is located on one side of the cylinder block (30), while the exhaust manifold (54), which is part of the exhaust device (49), is located on the opposite side from the air intake device (48). As a result, it is not necessary to integrate the exhaust passage within the cylinder block (30), as is done in conventional motors.

One side surface of the cylinder head (29) and one side surface of the engine holder (12) are coplanar, and form a support for the exhaust manifold (54). This construction makes it easy to control with precision the assembly of the parts. The machining time needed to construct the parts is reduced, and there is a lesser chance of exhaust gas leaking from the joints. Also, an open space is available on a side of the cylinder block (30), where electric instrumentation (47) can be located in a position shielded from exhaust heat.

Water jackets (55, 56) of the cylinder block (30) and of the cylinder head (29) are made separately from the exhaust manifold water jacket (58). Since the exhaust manifold water jacket (58) is independent from the other water jackets, the transfer of exhaust heat to the cylinders is prevented. In addition, the temperature of the exhaust manifold's exhaust passage can be adjusted independently of the other components.

A pressure valve (64) is provided in the cooling water outlet (61) of the exhaust manifold water jacket (58), to regulate the pressure in the water jacket (58). When the pressure in the exhaust water jacket is relieved, only water from that jacket is drained, so that the cooling water volume in the water jackets (55, 56) of the cylinder block (30) and of the cylinder head (29) does not change. This also allows better control of the cooling water temperature around the combustion chamber (33) and around the cylinder.

A valve cover (65) is provided in the cooling water outlet (61), and is integrated with a union member (65a), so that a separate union component becomes unnecessary.

A water opening (67) for water detection, communicating with the inside of the exhaust manifold water jacket (58), is provided at the bottom end of the exhaust manifold (54). Consequently, water opening (67) and water detection opening (66) used to detect cooling water need only be connected by a tube (68), thus simplifying the required piping.

An attachment base (69) to attach an oxygen sensor (70) is formed on the exhaust manifold (54), above the seal member (28), so that the sensor will not be exposed to seawater, and corrosion of the attachment base (69) will be prevented. A hole (71) to detect exhaust gas is formed above the exhaust manifold (54) and is closed with a freely removable plug (72), allowing detection of the exhaust gas without removing the lower cover (27b). Because a hook (73) used to hoist the engine is provided in the upper part of the exhaust manifold (54), the engine (17) can be hoisted without removing the ring gear cover (40).

One embodiment of the outboard motor exhaust device of the present invention is used in an outboard motor engine which comprises a horizontal assembly of a cylinder head, a cylinder block, and a crank case. An air intake device is located at one side of the cylinder block, and an exhaust manifold comprised in the exhaust device is located on the opposite side. A conventional exhaust passage formed within the cylinder block becomes unnecessary, so that the cylinder block can be designed small and lightweight, and the assembly of the exhaust manifold can be performed more simply and precisely.

Transmission of exhaust heat to the cylinder can be prevented, and the temperature of the exhaust manifold can be adjusted independently.

A pressure valve is provided in the cooling water outlet formed in the exhaust manifold water jacket, with a valve cover being provided on the cooling water outlet. This cover valve is integral with a union member that can be attached to a wastewater hose. Consequently, cylinder block cooling efficiency can be increased, and the cooling water discharge structure of the exhaust manifold can be simplified. An opening used for water testing, that communicates with the inside of the exhaust manifold, is provided at the bottom end of said manifold, requiring simpler piping to test the water.

It will be apparent to those skilled in the art that various modifications and variations can be made in the structure and the methodology of the present invention without departing from the spirit or scope of the invention. Thus, it is intended that the present invention cover the modifications and variations of this invention provided they come within the scope of the appended claims and their equivalents.

What is claimed is:

1. An exhaust system of an outboard motor having an engine with horizontally assembled vertically oriented cylinder head, cylinder block, and crank case components comprising:

an engine holder disposed below the engine;

an air intake device located on one side of the cylinder block; and an exhaust manifold located on another side of the cylinder block opposite to the air intake device;

wherein a side surface of the cylinder head and a side surface of the engine holder are coplanar and support the exhaust manifold.

2. The exhaust system of claim 1, further comprising:

a cylinder block water jacket formed within the cylinder block;

a cylinder head water jacket formed within the cylinder head; and an exhaust manifold water jacket for cooling the exhaust manifold;

said exhaust manifold water jacket being of different type and independent from the cylinder block and cylinder head water jackets.

3. The exhaust system of claim 2, further comprising:

a cooling water outlet formed in the exhaust manifold water jacket;

a pressure valve provided in the cooling water outlet;

a valve cover provided in the cooling water outlet, adjacent the pressure valve; and a union member integral with the valve cover and connecting the exhaust manifold water jacket to a wastewater hose.

4. The exhaust system of claim 2, further comprising a water opening provided at a bottom end of the exhaust manifold and communicating with the exhaust manifold water jacket, for detecting cooling water.

* * * * *